United States Patent
Ma et al.

(10) Patent No.: US 6,848,337 B2
(45) Date of Patent: Feb. 1, 2005

(54) TRANSMISSION MECHANISM FOR DRIVING FOUR WHEELS

(75) Inventors: Weijin Ma, Urumchi (CN); Mingxue Yang, Urumchi (CN); Yujiang Wang, Urumchi (CN); Yingpu Wang, Urumchi (CN); Bin Lang, Urumchi (CN); Yongge Fan, Miquan (CN); Wenbin Pan, Urumchi (CN); Feng Gao, Beijing (CN)

(73) Assignee: Xinjiang Shengsheng Co., Ltd., Urumchi (CN)

( * ) Notice: Subject to any disclaimer, the term of this patent is extended or adjusted under 35 U.S.C. 154(b) by 0 days.

(21) Appl. No.: 10/659,040

(22) Filed: Sep. 10, 2003

(65) Prior Publication Data

US 2004/0092354 A1 May 13, 2004

(30) Foreign Application Priority Data

Sep. 12, 2002 (CN) .......................... 02253907

(51) Int. Cl.[7] .................. F16H 48/06; F16H 33/00; F16H 35/00; F16H 37/00
(52) U.S. Cl. .................. 74/640; 475/203; 475/206; 475/230
(58) Field of Search ........... 74/640, 650; 475/200–201, 475/203, 206, 230

(56) References Cited

U.S. PATENT DOCUMENTS

| | | | |
|---|---|---|---|
| 1,362,490 A | * 12/1920 | Keck | ................. 74/329 |
| 2,306,545 A | * 12/1942 | Kummich | ................. 475/203 |
| 2,454,685 A | * 11/1948 | Avila | ................. 475/203 |
| 3,309,943 A | * 3/1967 | Kosman et al. | ................. 475/200 |
| 4,611,504 A | * 9/1986 | Rundle | ................. 475/198 |
| 4,662,241 A | * 5/1987 | Edwards | ................. 475/206 |
| 4,713,983 A | * 12/1987 | Rundle | ................. 475/206 |
| 4,966,574 A | * 10/1990 | von Kaler et al. | ................. 475/206 |
| 5,041,067 A | * 8/1991 | Hauser | ................. 475/211 |
| 6,694,835 B2 | * 2/2004 | Kawahara | ................. 74/355 |
| 2004/0050196 A1 | * 3/2004 | Ma et al. | ................. 74/344 |
| 2004/0087406 A1 | * 5/2004 | Ma et al. | ................. 475/209 |
| 2004/0118242 A1 | * 6/2004 | Ma et al. | ................. 74/650 |
| 2004/0124025 A1 | * 7/2004 | Ma et al. | ................. 180/248 |

* cited by examiner

Primary Examiner—Tisha Lewis
(74) Attorney, Agent, or Firm—Garvey, Smith, Nehrbass & Doody, L.L.C.; Seth M. Nehrbass; Brett A. North

(57) ABSTRACT

The present invention provides a transmission mechanism with a differential mechanism for an automotive vehicle to drive four wheels instead of two differential mechanisms of prior art disposed on the front axle and rear axle. The transmission mechanism of the invention is of a compact structure and a relatively less cost of manufacturing, and makes a clearance between the chassis of the automotive vehicle and the ground increased. The performance of the automotive vehicle equipped with the transmission mechanism of the invention can be improved.

20 Claims, 3 Drawing Sheets

TRANSMISSION MECHANISM FOR DRIVING FOUR WHEELS

Priority is claimed to Chinese application number 02253907.7, filed Sep. 12, 2002, which is incorporated herein by reference.

BACKGROUND OF THE INVENTION

1. Field of the Invention

The present invention relates to a transmission mechanism of automotive vehicles, and more particularly to a transmission mechanism for driving four wheels.

2. Description of the Related Art

Many transmission mechanisms with a differential gear lock limiting mechanism have been used in some automotive vehicles. Because when an automotive vehicle encounters weaker roads, such as loose soil, foothill and the like, two wheels of the automotive vehicle at the same side may lose adhesions to the ground to cause skidding. The differential gear lock limiting mechanism can limit different rotating speeds of the two wheels up to locking the differential gear of the automotive vehicle. In this case, the driving side shafts of the two sides will be integral, and the automotive vehicle can only be driven in line. Moreover, the differential gear lock limiting mechanism used in the art is complicated, expensive and difficult to maintain.

Hence, a transmission mechanism that overcomes the above-mentioned problems is desired.

SUMMARY OF THE INVENTION

Accordingly, an object of the present invention is to provide a transmission mechanism for driving four wheels of an automotive vehicle that overcomes the shortcomings in the prior art.

In order to achieve the above-mentioned object, a transmission mechanism for driving four wheels of an automotive vehicle in accordance with the present invention comprises a drive housing; a differential mechanism including a right side bevel gear, a left side bevel gear and a ring gear; a driving power input shaft mounted to the left upper portion of the drive housing; a first dual tandem gear mounted on the driving power input shaft; a second dual tandem gear mounted on the driving power input shaft; a propeller shaft mounted to the left middle portion of the drive housing; a sixth gear fixed to the propeller shaft; a fourth gear mounted on the propeller shaft; a fifth gear mounted on the propeller shaft; a third dual tandem gear mounted on the propeller shaft; a core shaft mounted to the left lower portion of the drive housing, on which the differential mechanism is mounted; a eighth gear connected with the core shaft; a seventh gear connected with the core shaft; a front right wheel output shaft engaged with the core shaft via a engaging member; a front left wheel output shaft engaged with the core shaft via a slidable engaging member; a rear left wheel output shaft mounted to the right lower portion of the driving housing; a ninth gear fixed to the rear left wheel output shaft; and when the driving power input shaft is driven, the second dual tandem gear can be regulated to mesh with either the third dual tandem gear or the first dual tandem gear, so that the differential mechanism can obtain different speeds, and wheels at the same side of the automotive vehicle can be driven at the same time.

In one embedment of the present invention, the front right wheel output shaft is mounted within the front left wheel output shaft, and the front left wheel output shaft is engaged the seven gear with a slidable engaging member.

In another embodiment of the invention, the first dual tandem gear includes a first larger gear and an inner gear at a side surface of the larger gear to mesh with a second smaller gear of the second dual tandem gear.

In a further embodiment of the invention, each of the second dual tandem gear and the slidable engaging member provides a recess at the outer surface thereof for connecting a fork.

In the invention, he third dual tandem gear may include a third larger gear and a third smaller gear to mesh with a larger gear of the second dual tandem gear and the first larger gear, respectively, and the second dual tandem gear may be splined to the driving power input shaft.

The transmission mechanism of the present invention makes use of a differential mechanism to drive four wheels instead of two differential mechanisms in the prior art disposed on the front axle and rear axle. Therefore, the transmission mechanism is of a compact structure, which increases the clearance between the chassis of the automotive vehicle and the ground. Furthermore, the differential mechanism used makes speeds between the left side wheels and the right side wheels different. Thus, the performance of the automotive vehicle is improved and the automotive vehicle can be steered smoothly.

Other objects, features and advantages of the present invention will become apparent from the following detailed description when read in conjunction with the accompanying drawings.

DETAILED DESCRIPTION OF PREFERRED EMBODIMENTS OF THE INVENTION

The present invention will be further described below with reference to the drawings.

Figure 1:
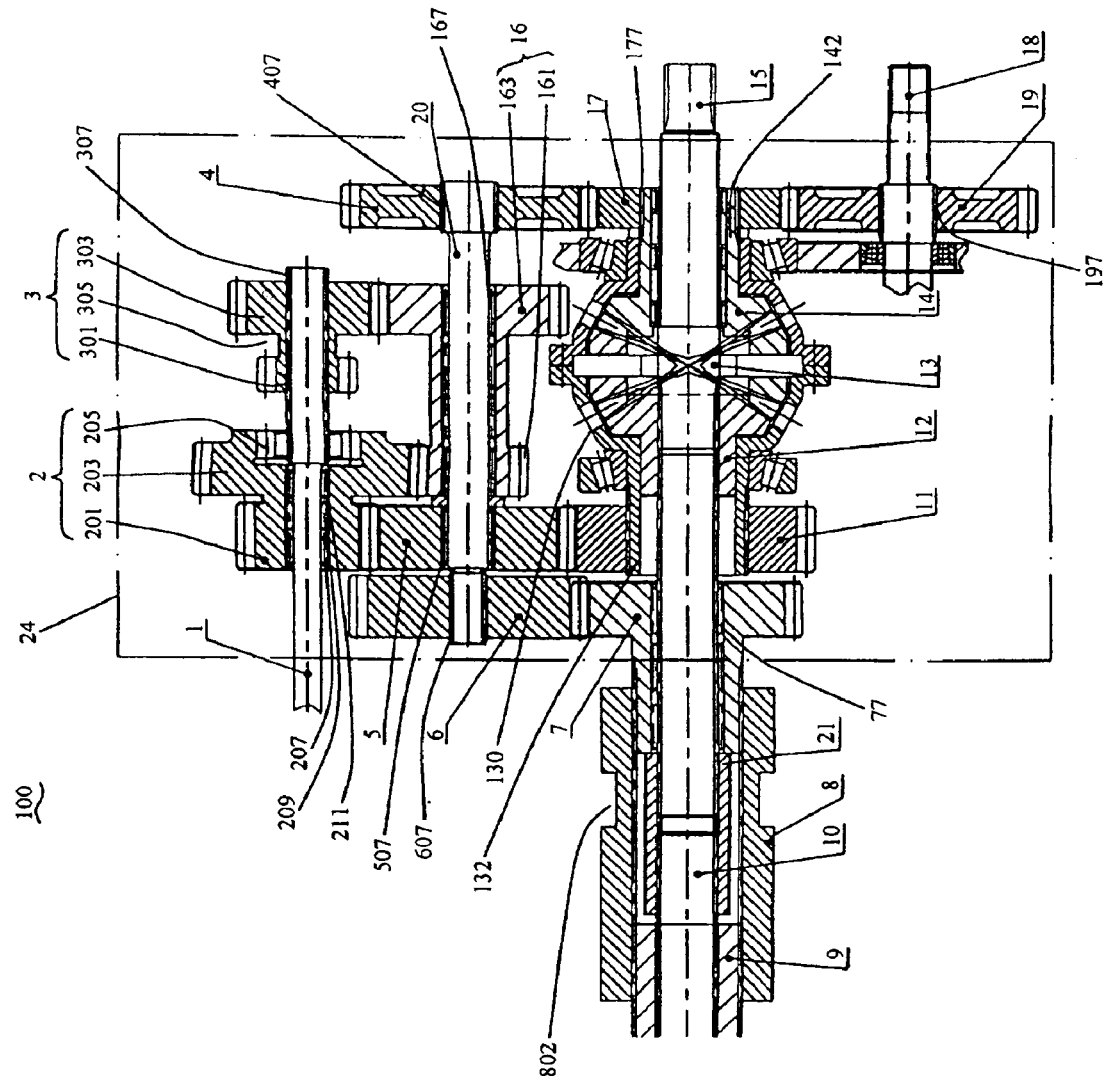
FIG. 1 is a schematic plan view of a transmission mechanism in accordance with the present invention.
Figure 2:
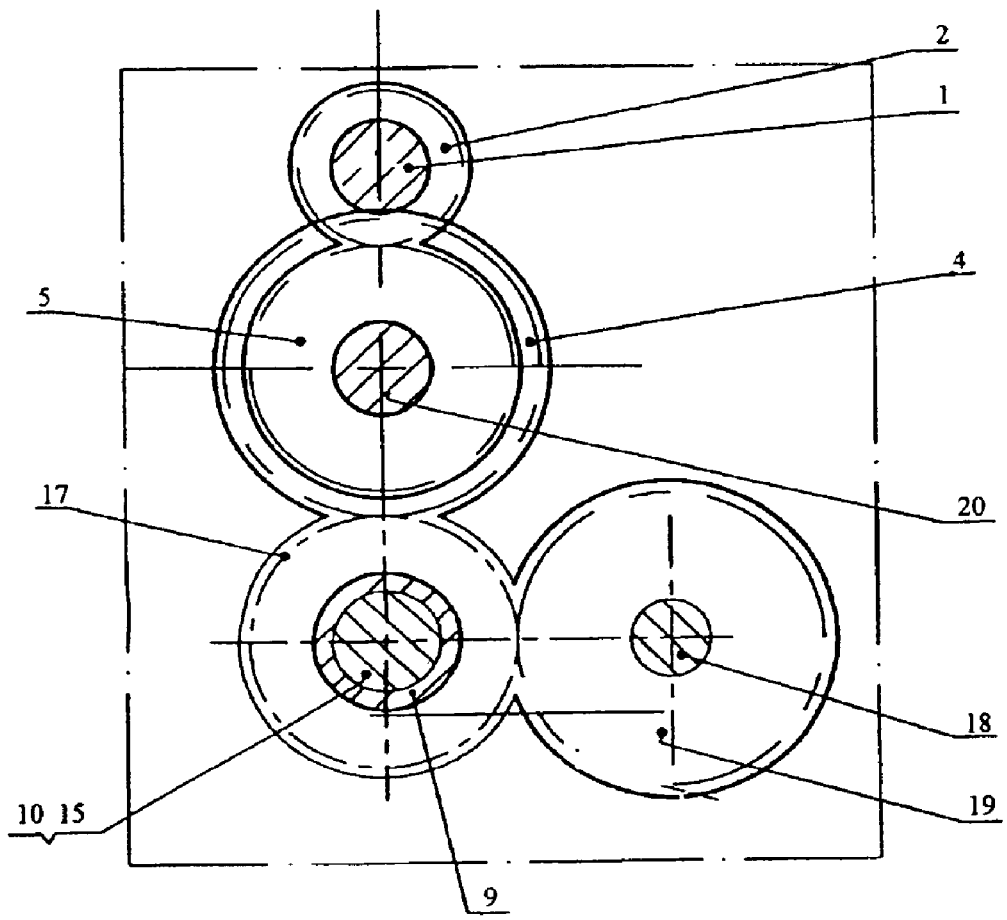
FIG. 2 is a schematic and sketching side view showing the location of shafts of the transmission mechanism as shown in FIG. 1.
Figure 3:
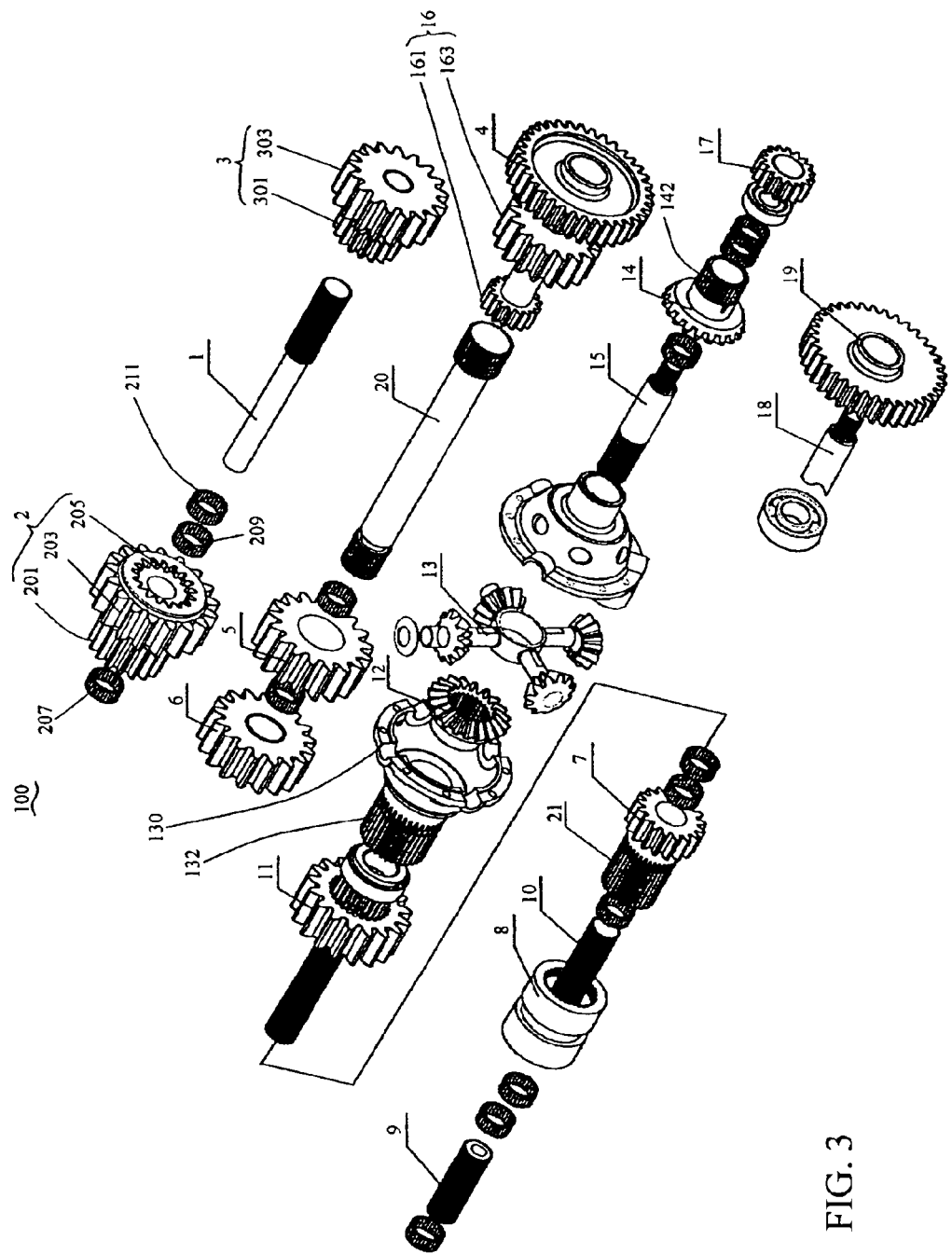
FIG. 3 is a schematically explored view of a transmission mechanism in accordance with the present invention.

Referring to FIGS. 1 to 3, a transmission mechanism 100 of an automotive vehicle for driving four wheels in accordance with the present invention comprises a drive housing 24, a driving power input shaft 1, a propeller shaft 20, a core shaft 15, a rear left wheel output shaft 18, a front left wheel output shaft 9, a front right wheel output shaft 10, and a differential mechanism 13 disposed at the lower portion of the drive housing 24 and including a right side bevel gear 14, a left side bevel gear 12 and a ring gear 11.

The driving power input shaft 1 is connected with an engine (not shown) of the automotive vehicle (not shown) and disposed at the left upper portion of the driving housing 24. A first dual tandem gear 2 having a first larger gear 203 and a first smaller gear 201 is mounted on the input shaft 1 via three roller bearings 207, 209 and 211, and provides an inner gear 205 extended inward from a side surface of the first larger gear 203. A second dual tandem gear 3 having a second larger gear 303 and a second smaller gear 301 is splined to the input shaft 1 via a first spline 307, and the second smaller gear 301 can mesh with the inner gear 205 of the first dual tandem gear 2.

The propeller shaft 20 is disposed at the left middle portion of the driving housing 24. A sixth gear 6 is splined to the propeller shaft 20 via a second spline 607, a fourth gear 4 and a fifth gear 5 are mounted on the propeller shaft 20 via a third spline 407 and a roller bearing 507, respectively. A third dual tandem gear 16 including a third larger gear 163 and a third smaller gear 161 to respectively mesh with the second larger gear 303 of the second dual tandem gear 3 and the first larger gear 203 of the first dual tandem gear 2 is mounted on the propeller shaft 20 via a roller bearing 167.

Elements of the differential mechanism 13 used in this invention are the same as those in the prior art except those specifically described herein. The core shaft 15 is disposed at the left lower portion of the driving housing 24. The right side bevel gear 14 and the left side bevel gear 12 are mounted on the core shaft 15. An eighth gear 17 meshing with the fourth gear 4 is splined to a first shaft sleeve 142 of the right side bevel gear 14 via a fourth spline 177. The ring gear 11 meshing with the fifth gear 5 is fixed on a second shaft sleeve 132 of a differential case 130 of the differential mechanism 13. A seventh gear 7 meshing with the sixth gear 6 is mounted on the core shaft 15 via a roller bearings 77.

The front right wheel output shaft 10 is coaxially connected with the core shaft 15 via an engaging member 21. The front right wheel output shaft 10 is mounted within, and is connected to via a slidable engaging member 8, the front left wheel output shaft 9.

The rear left wheel output shaft 18 is connected with a rear left wheel (not shown) of the automotive vehicle and disposed at the right lower portion of the driving housing 24. A ninth gear 19 is splined to the rear left wheel output shaft 18 via a fifth spline 197 to mesh with the eighth gear 17.

Recesses 305 and 802 are provided at the outer surface of the second dual tandem gear 3 and the slidable engaging member 8, respectively, to accommodate forks (not shown) which extend out of the drive housing 24.

The operation of the transmission mechanism 100 of the present invention for driving four wheels will now be described as follows. The driving power is transmitted to the driving power input shaft 1, which drives the second dual tandem gear 3 to rotate around the input shaft 1. The second dual tandem gear 3 can be regulated to mesh with either the third larger gear 163 of the third dual tandem gear 16 with the larger gear 303 or the first dual tandem gear 2 with the second smaller gear 301.

Then, the driving power through the first smaller gear 201 is transmitted to the ring gear 11 of the differential mechanism 13 and drives it to rotate together with the right side bevel gear 14 and the left side bevel gear 12. The driving power through the differential mechanism 13 is divided into two parts. The part of the driving power through the right side bevel gear 14 is further divided into two subparts. One subpart can be transmitted to, and then drive, the rear left wheel output shaft 18 via the eighth gear 17 and the ninth gear 19. Another subpart can be transmitted to the propeller shaft 20 via the eighth gear 17 and the fourth gear 4, and then transmitted to the slidable engaging member 8 via the sixth gear 6 and the seventh gear 7, at last transmitted to the front left wheel output shaft 9.

Another part of the driving power through the left side bevel gear 12 is transmitted to the core shaft 15 via the corresponding splines and is further divided into two subparts. A subpart is transmitted to a rear right wheel (not shown) directly connected to the core shaft 15. Another subpart is transmitted to the front right output wheel 10 via the engaging member 21. As a result, the two front output shafts 9, 10 are driven by the slidable engaging members 8 matching with the engaging member 21, and the two rear output shafts are driven in parallel. With the transmission mechanism 100 of the present invention, the wheels at the same side can be driven at the same time.

When an automotive vehicle equipped the transmission mechanism of the invention moves on weaker roads, even though a wheel skids and loses the adhesion to the ground, the output power of the engine will not decrease because the skidding wheel doesn't rotate. Meanwhile, another unskidding wheel at the same side can still be driven because the two wheels are controlled by the same side bevel gear. Because other two wheels at another side are controlled by another side bevel gear, the vehicle can run normally. As a result, when two wheels at the same side skid, the vehicle can move via the other two unskidding wheels at the same side, and when two wheels at the different sides skid, the automotive vehicle can move via the other two unskidding wheels at the different sides.

It is understood that the particular structures embodying the present invention shown and described above are only used for illustrating the present invention, and are not intended to limit the invention. Any modifications or variations to the present invention without departing from the spirit of the invention shall be fallen into the scope of the invention defined by the appended claims.

What is claimed is:

1. A transmission mechanism of an automotive vehicle for driving four wheels comprising
   a drive housing (24);
   a differential mechanism (13) including a right side bevel gear (14), a left side bevel gear (12) and a ring gear (11);
   a driving power input shaft (1) disposed at the left upper portion of said drive housing (24);
   a first dual tandem gear (2) mounted on said driving power input shaft (1);
   a second dual tandem gear (3) slidably mounted on said driving power input shaft (1);
   a propeller shaft (20) disposed at said left middle portion of said drive housing (24);
   a fourth gear (4) mounted on one end of said propeller shaft (20);
   a sixth gear (6) mounted on another end of said propeller shaft (20);
   a fifth gear (5) mounted on said propeller shaft (20) close to said sixth gear (6) and engaged to said first dual tandem gear (2) and said ring gear (11);
   a third dual tandem gear (16) mounted on said propeller shaft (20) and engaged to said first dual tandem gear (2);
   a core shaft (15) disposed at said left lower portion of said drive housing (24), on which said differential mechanism (13) is mounted;
   a seventh gear (7) mounted on said core shaft (15) to engage said sixth gear (6);
   an eighth gear (17) connected with said core shaft (15) to engage said fourth gear (4);
   a front right wheel output shaft (10) engaged with said core shaft (15);
   a front left wheel output shaft (9) engaged with seventh gear (7);
   a rear left wheel output shaft (18) disposed at the right lower portion of said driving housing (24); and
   a ninth gear (19) mounted on said rear left wheel output shaft (18), wherein when said driving power input shaft (1) is driven, said second dual tandem gear (3) can be regulated to mesh with either said third dual tandem gear (16) or said first dual tandem gear (2) so that the automotive vehicle can obtain different speeds, and wheels at the same side of the automotive vehicle can be driven at the same time.

2. The transmission mechanism of claim 1, wherein said front right wheel output shaft (10) is mounted within said front left wheel output shaft (9), and said front left wheel output shaft (9) is engaged to said seventh gear (7) with a slidable engaging member (8).

3. The transmission mechanism of claim 1, wherein said first dual tandem gear (2) includes a first larger gear (203) and an inner gear (205) at a side surface of said larger gear (203) to mesh with a second smaller gear (301) of said second dual tandem gear (3).

4. The transmission mechanism of claim 2, wherein said first dual tandem gear (2) includes a first larger gear (203) and an inner gear (205) at a side surface of said larger gear (203) to mesh with a second smaller gear (301) of said second dual tandem gear (3).

5. The transmission mechanism of claim 2, wherein each of said second dual tandem gear (3) and said slidable engaging member (8) provides a recess (305, 802) at the outer surface thereof for connecting a fork.

6. The transmission mechanism of claim 4, wherein each of said second dual tandem gear (3) and said slidable engaging member (8) provides a recess (305, 802) at the outer surface thereof for connecting a fork.

7. The transmission mechanism of claim 1, wherein said third dual tandem gear (16) includes a third larger gear (163) and a third smaller gear (161) to mesh with a larger gear (303) of said second dual tandem gear (3) and said first larger gear (203), respectively.

8. The transmission mechanism of claim 2, wherein said third dual tandem gear (16) includes a third larger gear (163) and a third smaller gear (161) to mesh with a larger gear (303) of said second dual tandem gear (3) and said first larger gear (203), respectively.

9. The transmission mechanism of claim 3, wherein said third dual tandem gear (16) includes a third larger gear (163) and a third smaller gear (161) to mesh with a larger gear (303) of said second dual tandem gear (3) and said first larger gear (203), respectively.

10. The transmission mechanism of claim 4, wherein said third dual tandem gear (16) includes a third larger gear (163) and a third smaller gear (161) to mesh with a larger gear (303) of said second dual tandem gear (3) and said first larger gear (203), respectively.

11. The transmission mechanism of claim 5, wherein said third dual tandem gear (16) includes a third larger gear (163) and a third smaller gear (161) to mesh with a larger gear (303) of said second dual tandem gear (3) and said first larger gear (203), respectively.

12. The transmission mechanism of claim 6, wherein said third dual tandem gear (16) includes a third larger gear (163) and a third smaller gear (161) to mesh with a larger gear (303) of said second dual tandem gear (3) and said first larger gear (203), respectively.

13. The transmission mechanism of claim 1, wherein said second dual tandem gear (3) is splined to said driving power input shaft (1).

14. The transmission mechanism of claim 2, wherein said second dual tandem gear (3) is splined to said driving power input shaft (1).

15. The transmission mechanism of claim 3, wherein said second dual tandem gear (3) is splined to said driving power input shaft (1).

16. The transmission mechanism of claim 4, wherein said second dual tandem gear (3) is splined to said driving power input shaft (1).

17. The transmission mechanism of claim 5, wherein said second dual tandem gear (3) is splined to said driving power input shaft (1).

18. The transmission mechanism of claim 6, wherein said second dual tandem gear (3) is splined to said driving power input shaft (1).

19. The transmission mechanism of claim 7, wherein said second dual tandem gear (3) is splined to said driving power input shaft (1).

20. The transmission mechanism of claim 12, wherein said second dual tandem gear (3) is splined to said driving power input shaft (1).

* * * * *